United States Patent [19]
Latta et al.

[11] Patent Number: 4,784,447
[45] Date of Patent: Nov. 15, 1988

[54] HOLOGRAPHIC OBJECTIVE MIRROR FOR OPTICAL STORAGE

[75] Inventors: Milton R. Latta; Timothy C. Strand, both of San Jose, Calif.

[73] Assignee: International Business Machines Corporation, Armonk, N.Y.

[21] Appl. No.: 25,691

[22] Filed: Mar. 13, 1987

[51] Int. Cl.$^4$ ................................................ G02B 5/32
[52] U.S. Cl. ...................................... 350/3.72; 350/3.7
[58] Field of Search ................................. 350/3.7, 3.72

[56] References Cited

U.S. PATENT DOCUMENTS

| 4,004,081 | 1/1977 | Zorn | 369/111 |
| 4,203,652 | 5/1980 | Hanada | 350/421 |

FOREIGN PATENT DOCUMENTS 0123048  10/1984  European Pat. Off. ............. 350/3.7

OTHER PUBLICATIONS

R. A. Chipman, "Monochromator Designs with Aberration Corrected Gratings,", SPIE vol. 237, 1980 Int'l Lens Design Conf. (OSA), pp. 439–445.

Sincerbox, G., "Formation of Optical Elements by Holography," *IBM Tech. Disc. Bull.*, vol. 10, No. 3, Aug. 1967, pp. 267–268.

*Primary Examiner*—John K. Corbin
*Assistant Examiner*—David J. Edmondson
*Attorney, Agent, or Firm*—Joseph G. Walsh

[57] ABSTRACT

A holographic mirror is used in an optical storage head to diffract a laser beam perpendicularly to the optical medium and also to focus the beam onto the optical medium. The mirror can also function to cause circularization of a collimated laser beam of elliptical cross-section.

1 Claim, 2 Drawing Sheets

HOLOGRAPHIC OBJECTIVE MIRROR SYSTEM

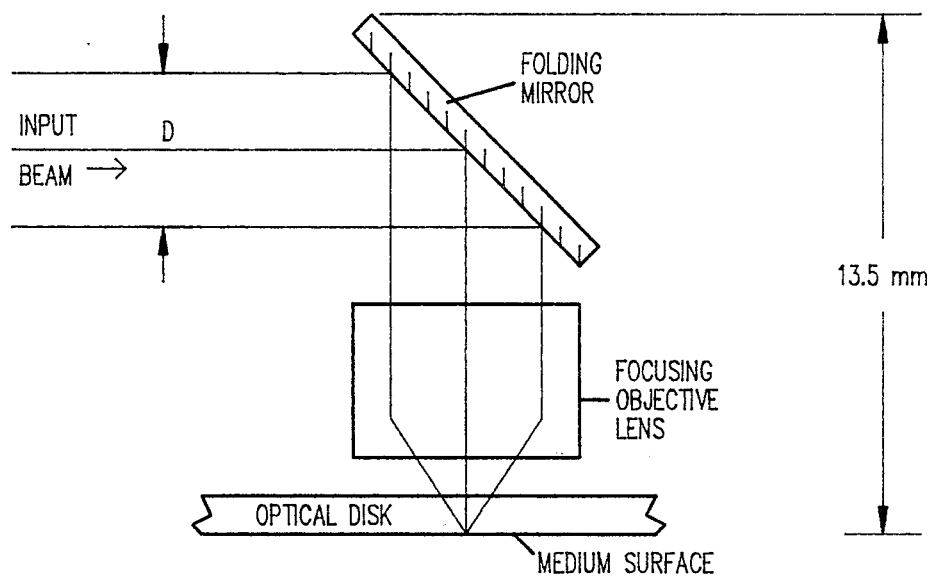
FIG. 1A  CONVENTIONAL SYSTEM
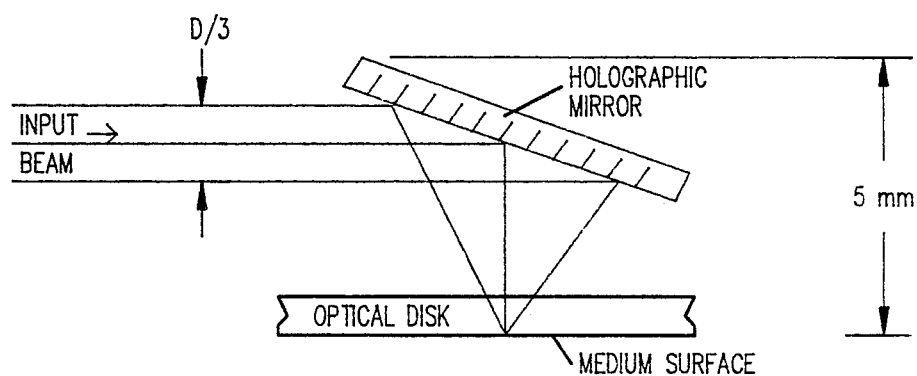
FIG. 1B  HOLOGRAPHIC OBJECTIVE MIRROR SYSTEM

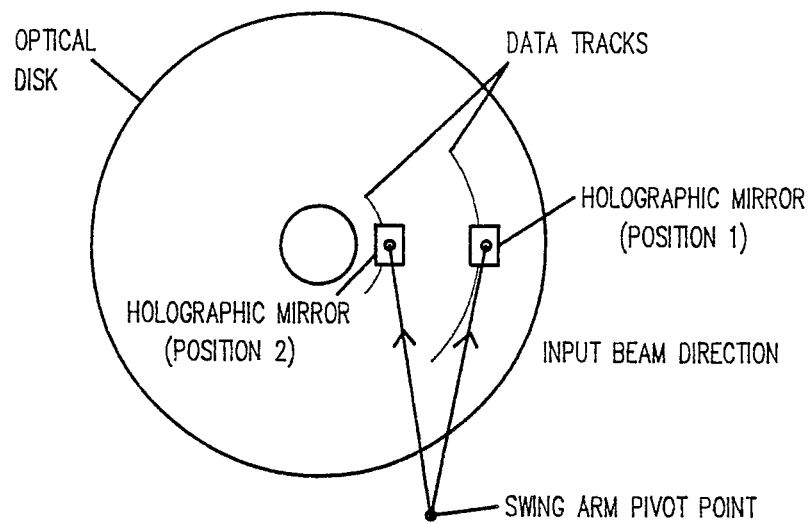
FIG. 2A    SWING ARM CONFIGURATION
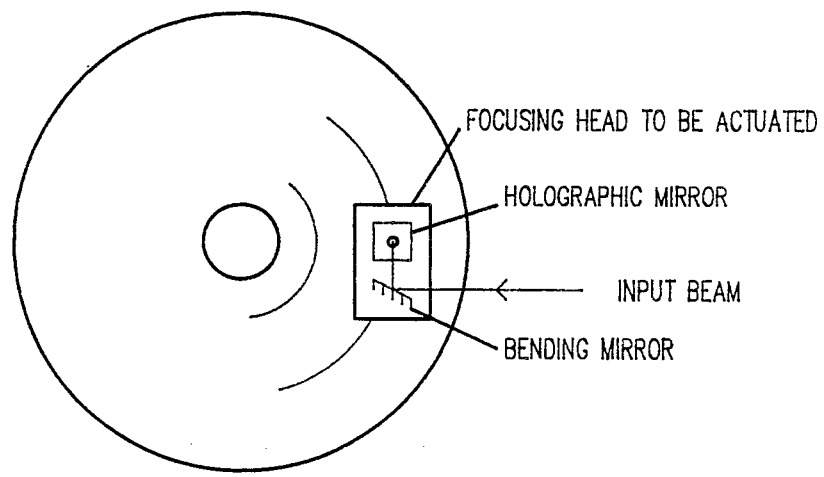
FIG. 2B    "SLED" TYPE CONFIGURATION

HOLOGRAPHIC OBJECTIVE MIRROR FOR OPTICAL STORAGE

TECHNICAL FIELD

The present invention deals with a holographic objective mirror for use in an optical storage head.

BACKGROUND ART

In the current state of the art, an objective lens and a folding mirror are used to focus a light beam onto an optical recording medium.

SPIE Vol. 237, 1980, International Lens Design Conference (OSA), pp. 439–445, shows the use of concave aberration corrected holographic gratings to diffract and focus.

U.S. Pat. No. 4,004,081 shows a parabolic mirror which simultaneously performs the functions of focusing device and deflection mirror.

U.S. Pat. No. 4,203,652 shows a beam of light from a semiconductor laser having different angles of divergence and different origins of divergence being collimated or efficiently treated into a circular spot light by a beam shaping optical system.

DISCLOSURE OF THE INVENTION

According to the present invention, a device is provided for focusing a laser beam onto a track-containing optical storage medium. The device comprises means for directing the laser beam, in a direction tangential to the track direction on the optical medium, to a holograph mirror which diffracts the laser beam perpendicularly to the optical medium and which also focuses the beam onto the optical medium.

DESCRIPTION OF THE DRAWINGS

An understanding of the invention is facilitated by reference to the accompanying drawings.

FIG. 1A is a schematic representation (not to scale) of a conventional system using a folding mirror and a focusing objective lens.

FIG. 1B is a schematic representation (not to scale) of the present invention, showing a holographic objective mirror used in an optical storage head.

FIGS. 2A and 2B show two variations of the present invention. FIG. 2A is a schematic representation (not to scale) which shows the use of a swing-arm arrangement to produce the required input beam direction. FIG. 2B is a schematic representation (not to scale) which shows a sled-type actuator having an additional folding mirror to bend the beam parallel to the track direction.

According to the present invention, the conventional objective lens and folding mirror in an optical storage head are both replaced by a reflective holographic mirror. In the conventional system, as shown in FIG. 1A, the beam is incident from the left. The beam strikes the 45 degree folding mirror, passes through the objective lens and is focused onto the optical medium. In the present invention, as shown in FIG. 1B, the functions of the folding mirror and objective lens are combined. The beam striking the holographic mirror is diffracted perpendicularly downward to the optical medium and, through proper design of the hologram, may be focused to a diffraction limited spot as well.

As can be seen, the perpendicular height required above the optical medium in the present invention is considerably reduced compared to the prior art. This is due to several factors: A. The incident beam is reduced in the dimension shown and the plano surface of the hologram substrate is inclined as shown. (Note: this would not work with a conventional mirror as the reflected beam would no longer be perpendicular to the optical media. However, the flexibility of holographic design permits the diffracted beam from the hologram to be directed in a non-specular direction as shown.) B. The optical focusing function is built into the (planar) reflective hologram. Thus, the physical thickness of the objective lens is eliminated. C. The additional clearance required between the mirror surface and objective lens for mounting is also eliminated. An approximation to the space savings possible is shown in the figure with the height reduced from 13.5 mm to 5 mm.

A second advantage of the present invention is the elimination of the objective lens mass. The mass of the holographic mirror should be very comparable to any folding mirror used in the conventional system. The hologram itself can be fabricated using metallized photoresist. Thus, the major mass contribution is that of the substrate. Typical mass savings would be 0.34 grams due to elimination of the objective lens.

A third advantage is the elimination of the beam circularizer used in conventional systems. The elliptically shaped beam coming from the collimator may be used as is in the holographic system. A typical ellipticity ratio of 3:1 is suitable as input to the holographic mirror. This allows the height reduction described and eliminates the need to expand the beam in the narrow direction to produce a circular cross-section.

Another feature of this holographic system is that it is possible to produce a non-normal illumination system through the inherent design flexibility of the holographic element. Thus, when it is desired to have separate beam paths for incident and collected light from the optical disk (with an angular separation between them rather than coincident beams incident perpendicular to the disk) for the purposes of laser noise reduction, for instance, that design flexibility is possible with this system.

A requirement of the holographic system is that the input beam direction is tangential to the track direction on the optical disk. This is required because as the laser frequency fluctuates, the deflection angle induced by the holographic element will experience a corresponding fluctuation. This, in turn, results in a displacement of the focused spot on the disk surface. It would be undesirable to have this beam displacement occur across the track and would probably not be objectionable to have it occur along the track as this only produces a small data rate error in the magneto-optic signal. Implementations to satisfy this requirement are shown in FIG. 2. FIG. 2A shows the use of a swing-arm arrangement to produce the required input beam direction and 2B shows a sled-type actuator which has an additional folding mirror to bend the beam parallel to the track direction.

In recent times, the gallium arsenide laser has become extensively used. The present invention is particularly useful in conjunction with such a laser, which produces a collimated beam of elliptical cross-section. The holographic mirror of the present invention causes circularization of the collimated beam having an elliptical cross-section. It is thus seen that in the present invention, there is achieved the combination of circularization, diffraction and focusing functions into a single element. The non-specular diffraction from a hologram leading to circularization is believed to be unique to the present invention.

We claim:

1. A device for focusing a laser beam onto a track-containing optical storage medium, said device comprising means for directing the laser beam, in a direction tangential to the track direction on the optical medium, to a holographic mirror which diffracts the laser beam perpendicularly to the optical medium and also focuses the beam onto the optical medium, with the maximum perpendicular height of the holographic mirror above the optical medium being 5 mm.

* * * * *